United States Patent
Yukizaki et al.

(10) Patent No.: US 10,789,841 B2
(45) Date of Patent: Sep. 29, 2020

(54) SYSTEM FOR COMMUNICATION BETWEEN MOBILE BODIES, MOBILE BODY TRANSMISSION CONTROL DEVICE, AND MOBILE BODY RECEIVING CONTROL DEVICE

(71) Applicant: DENSO CORPORATION, Kariya, Aichi-pref. (JP)

(72) Inventors: Yasumune Yukizaki, Kariya (JP); Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 116 days.

(21) Appl. No.: 16/083,659

(22) PCT Filed: Feb. 22, 2017

(86) PCT No.: PCT/JP2017/006455
§ 371 (c)(1),
(2) Date: Sep. 10, 2018

(87) PCT Pub. No.: WO2017/159242
PCT Pub. Date: Sep. 21, 2017

(65) Prior Publication Data
US 2019/0080603 A1    Mar. 14, 2019

(30) Foreign Application Priority Data
Mar. 18, 2016    (JP) .................. 2016-055977

(51) Int. Cl.
*G08G 1/0967* (2006.01)
*H04W 4/46* (2018.01)
(Continued)

(52) U.S. Cl.
CPC ......... *G08G 1/096725* (2013.01); *G08G 1/09* (2013.01); *H04L 1/22* (2013.01);
(Continued)

(58) Field of Classification Search
CPC ..... G08G 1/096725; G08G 1/09; H04W 4/46; H04W 4/44; H04W 4/80; H04W 4/00; H04W 4/027; H04L 1/22
See application file for complete search history.

(56) References Cited

U.S. PATENT DOCUMENTS

| | | | |
|---|---|---|---|
| 5,875,183 A * | 2/1999 | Nitadori | G01S 5/12 370/328 |
| 2003/0112780 A1* | 6/2003 | Ouyang | H04L 1/1845 370/338 |

(Continued)

FOREIGN PATENT DOCUMENTS

| | | | |
|---|---|---|---|
| JP | 2005513868 A | 5/2005 | |
| JP | 2008037414 A | 2/2008 | |

(Continued)

*Primary Examiner* — Courtney D Heinle
(74) *Attorney, Agent, or Firm* — Harness, Dickey & Pierce, P.L.C.

(57) ABSTRACT

A system for communication between mobile bodies includes: a mobile body transmission device that is used for a first mobile body and transmits first mobile information; and a mobile body reception device that is used for a second mobile body and receives the first mobile information. The mobile body transmission device includes: an indirect transmitter that transmits information via a base station; a direct transmitter that transmits information according to direct transmission; and a transmission controller that controls the indirect transmitter and the direct transmitter to transmit an identical first mobile information. The mobile body reception device includes: an indirect receiver that receives the first mobile information transmitted by the indirect transmitter via the base station; and a direct receiver that directly receives the first mobile information transmitted by the direct transmitter.

9 Claims, 6 Drawing Sheets

(51) Int. Cl.
  *H04W 4/44* (2018.01)
  *H04W 4/80* (2018.01)
  *G08G 1/09* (2006.01)
  *H04L 1/22* (2006.01)
  *H04W 4/00* (2018.01)
  *H04W 4/02* (2018.01)

(52) U.S. Cl.
  CPC ............. *H04W 4/00* (2013.01); *H04W 4/027* (2013.01); *H04W 4/44* (2018.02); *H04W 4/46* (2018.02); *H04W 4/80* (2018.02)

(56) References Cited

U.S. PATENT DOCUMENTS

| | | | | |
|---|---|---|---|---|
| 2007/0249284 | A1* | 10/2007 | Asami | G08G 1/096716 |
| | | | | 455/39 |
| 2008/0012693 | A1* | 1/2008 | Shimomura | B60R 25/102 |
| | | | | 340/426.1 |
| 2008/0270013 | A1* | 10/2008 | Ishikawa | G01C 21/28 |
| | | | | 701/117 |
| 2009/0022089 | A1* | 1/2009 | Rudrapatna | H04B 7/0671 |
| | | | | 370/328 |
| 2009/0296680 | A1* | 12/2009 | Suzuki | H04W 72/0406 |
| | | | | 370/342 |
| 2013/0230173 | A1* | 9/2013 | Hori | H04L 63/06 |
| | | | | 380/281 |
| 2018/0053404 | A1* | 2/2018 | Horita | B60R 21/00 |
| 2019/0075436 | A1* | 3/2019 | Yukizaki | G08G 1/09 |
| 2019/0082314 | A1* | 3/2019 | Yukizaki | G08G 1/09 |
| 2019/0098470 | A1* | 3/2019 | Yukizaki | G08G 1/09 |

FOREIGN PATENT DOCUMENTS

| | | |
|---|---|---|
| JP | 2008294605 A | 12/2008 |
| JP | 2009252214 * | 10/2009 |
| JP | 2009252214 A | 10/2009 |
| JP | 2012025353 * | 2/2012 |
| JP | 2012025353 A | 2/2012 |
| JP | 2013225875 A | 10/2013 |
| JP | 2014239284 A | 12/2014 |
| JP | 2015062315 A | 4/2015 |
| JP | 2016072771 A | 5/2016 |
| JP | 2016201051 A | 12/2016 |
| WO | WO-2009011756 A | 1/2009 |
| WO | WO-2017159239 A1 | 9/2017 |
| WO | WO-2017159240 A1 | 9/2017 |
| WO | WO-2017159241 A1 | 9/2017 |

* cited by examiner

SYSTEM FOR COMMUNICATION BETWEEN MOBILE BODIES, MOBILE BODY TRANSMISSION CONTROL DEVICE, AND MOBILE BODY RECEIVING CONTROL DEVICE

CROSS REFERENCE TO RELATED APPLICATIONS

This application is a U.S. National Phase Application under 35 U.S.C. 371 of International Application No. PCT/JP2017/006455 filed on Feb. 22, 2017 and published in Japanese as WO/2017/159242 A1 on Sep. 21, 2017. This application is based on and claims the benefit of priority from Japanese Patent Application No. 2016-055977 filed on Mar. 18, 2016. The entire disclosures of all of the above applications are incorporated herein by reference.

TECHNICAL FIELD

The present disclosure relates to a system for communication between mobile bodies to perform communication between mobile bodies, and a mobile body transmission control device and a mobile body receiving control device included in the system for communication between mobile bodies.

BACKGROUND ART

There is known a variety of vehicular communication apparatuses to perform wireless communication with communication apparatuses used for other vehicles. Patent literature 1 discloses a configuration in which one vehicle is mounted with a telephone apparatus to perform communication with a center via a telephone network in addition to an inter-vehicle communication apparatus to perform wireless communication with other vehicles.

A vehicle disclosed in patent literature 1 uses a telephone apparatus to determine whether communication with the center is available. The telephone apparatus is used to transmit vehicle information to the center if the telephone apparatus can be used for the communication. The inter-vehicle communication apparatus transmits vehicle information to other vehicles if the telephone apparatus fails and cannot be used for communication. When receiving the vehicle information, another vehicle uses the telephone apparatus to transmit the vehicle information received during the inter-vehicle communication to the center.

PRIOR ART LITERATURES

Patent Literature

Patent Literature 1: JP 2008-37414 A

SUMMARY

The inter-vehicle communication may often transmit and receive location information about other vehicles so as to be used for vehicle control. The inter-vehicle communication therefore often requires high robustness. The inter-vehicle communication in the present specification includes not only direct communication between vehicles, but also indirect communication between vehicles.

The configuration according to patent literature 1 individually allows the inter-vehicle communication apparatus and the telephone apparatus to enable the communication between the vehicle and the center. This improves a possibility of communication between the vehicle and the center. However, patent literature 1 is devoid of a configuration to improve the robustness of the inter-vehicle communication. There is therefore demand for a technology to improve the robustness of the inter-vehicle communication.

A technology to improve the communication robustness is also demanded of communication between mobile bodies other than vehicles. There is demand for a technology to improve the robustness of inter-mobile communication regardless of whether the mobile body is a vehicle or not.

It is an object of the present disclosure to provide a system for communication between mobile bodies, a mobile body transmission control device, and a mobile body receiving control device capable of highly robust inter-mobile communication.

According to a first aspect of the present disclosure, a system for communication between mobile bodies includes: a mobile body transmission device that is used for a first mobile body and successively transmits first mobile information as information about the first mobile body; and a mobile body reception device that is used for a second mobile body and receives the first mobile information. The mobile body transmission device includes: an indirect transmitter that transmits information via a base station; a direct transmitter that transmits information according to direct transmission; and a transmission controller that controls the indirect transmitter and the direct transmitter to transmit an identical first mobile information. The mobile body reception device includes: an indirect receiver that receives the first mobile information transmitted by the indirect transmitter via the base station; and a direct receiver that directly receives the first mobile information transmitted by the direct transmitter.

According to the above-mentioned system for communication between mobile bodies, the transmission controller included in the mobile body transmission device used for the first mobile body allows the wide area transmitter and the direct transmitter to transmit the identical first mobile information. The mobile body reception device used for the second mobile body includes the wide area receiver and the direct receiver and can therefore receive the first mobile information regardless of whether the wide area transmitter transmits the first mobile information or the direct transmitter transmits the first mobile information. It is therefore possible to provide the highly robust inter-mobile communication.

According to a second aspect of the present disclosure, a mobile body transmission control device that is used for a mobile body having an indirect transmitter transmitting information via a base station and a direct transmitter transmitting information according to direct transmission, and successively transmits mobile information about the mobile body, the mobile body transmission control device includes: a transmission information acquirer that acquires the mobile information to be transmitted; and a transmission controller that simultaneously transmits an identical mobile information acquired by the transmission information acquirer to the indirect transmitter and the direct transmitter.

According to the above-mentioned mobile body transmission control device, the transmission controller included in the mobile body transmission device used for the mobile body allows the wide area transmitter and the direct transmitter to transmit the identical mobile information. The mobile body reception device used for the other mobile body includes the wide area receiver and the direct receiver and can therefore receive the mobile information regardless of whether the wide area transmitter transmits the mobile information or the direct transmitter transmits the mobile information. It is therefore possible to provide the highly robust inter-mobile communication.

According to a third aspect of the present disclosure, a mobile body receiving control device that is used for a mobile body having: an indirect receiver receiving other-mobile information via a base station, the other-mobile information being transmitted from an other mobile body relating to the other mobile body; and a direct receiver directly receiving the other-mobile information, the mobile body receiving control device includes: a reception information acquirer that acquires the other-mobile information from the indirect receiver when the indirect receiver receives the other-mobile information, and acquires the other-mobile information from the direct receiver when the direct receiver receives the other-mobile information; an identity determiner that determines whether a most recently acquired other-mobile information is identical to an already acquired other-mobile information when the reception information acquirer acquires the other-mobile information from one of the indirect receiver and the direct receiver; and a mobile transmitter that transmits the most recently acquired other-mobile information to a mobile controller used for the mobile body when the identity determiner determines that the most recently acquired other-mobile information is not identical to the already acquired other-mobile information.

According to the above-mentioned mobile body receiving control device, the transmission controller included in the mobile body transmission device used for the other mobile body allows the wide area transmitter and the direct transmitter to transmit the identical other mobile information. The mobile body reception device used for the mobile body includes the wide area receiver and the direct receiver and can therefore receive the other mobile information regardless of whether the wide area transmitter transmits the other mobile information or the direct transmitter transmits the other mobile information. It is therefore possible to provide the highly robust inter-mobile communication.

BRIEF DESCRIPTION OF DRAWINGS

The above and other objects, features and advantages of the present disclosure will become more apparent from the following detailed description made with reference to the accompanying drawings. In the drawings.

EMBODIMENTS

First Embodiment

Figure 1:
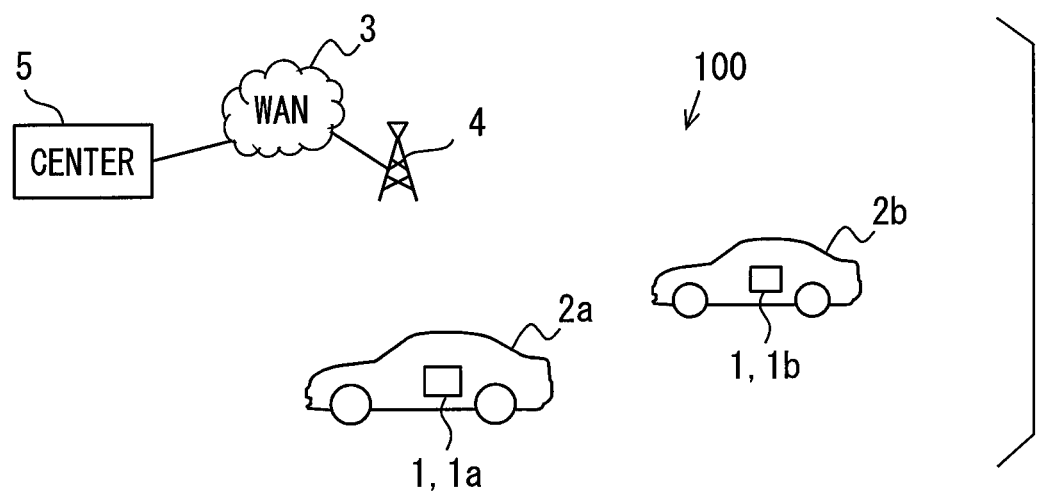
FIG. 1 is a diagram illustrating an entire configuration of the inter-vehicle communication system according to a first embodiment.

Embodiments of the present disclosure will be described with reference to the accompanying drawings. FIG. 1 is a diagram illustrating a schematic configuration of an inter-vehicle communication system 100. The inter-vehicle communication system 100 is comparable to a system for communication between mobile bodies. The inter-vehicle communication system 100 according to the first embodiment includes a plurality of onboard systems 1 and a center 5 illustrated in FIG. 1. The onboard systems 1 are individually mounted on a plurality of vehicles 2. According to the example in FIG. 1, the onboard system 1a is mounted on the vehicle 2a and the onboard system 1b is mounted on the vehicle 2b. The onboard systems 1a and 1b are equally configured except that these are mounted on the different vehicles 2a and 2b. The onboard systems 1a and 1b are simply described as the onboard system 1 when there is no need to distinguish between the onboard systems 1a and 1b mounted on the vehicles 2a and 2b. The vehicles 2a and 2b are simply described as the vehicle 2 when there is no need to distinguish between the vehicles 2a and 2b. FIG. 1 illustrates only two vehicles 2 mounted with the onboard system 1. However, the onboard system 1 may be mounted on each of three or more vehicles 2.

Overview

The inter-vehicle communication system 100 provides mutual wireless communication between the onboard systems 1 mounted on the different vehicles 2. The vehicle 2 is supposed to run on roads and there are no limitations otherwise. The vehicle includes a four-wheel car, a motorcycle, and a bicycle.

The onboard system 1 performs wireless communication with another onboard system 1 by using a radio wave in a predetermined frequency band without using a wide area communication network 3. The onboard system 1 can also perform wireless communication with another onboard system 1 by using the wide area communication network 3. Namely, the onboard system 1 is capable of the inter-vehicle communication with or without the use of the wide area communication network 3.

In the description below, the inter-vehicle communication without the use of the wide area communication network 3 is represented as direct inter-vehicle communication and the inter-vehicle communication with the use of the wide area communication network 3 is represented as indirect inter-vehicle communication. The direct inter-vehicle communication provides a communication range narrower than the indirect inter-vehicle communication. Therefore, the direct inter-vehicle communication may be referred to as narrow-band inter-vehicle communication and the indirect inter-vehicle communication may be referred to as wide area inter-vehicle communication.

The direct inter-vehicle communication uses a frequency band of 760 MHz, for example. Available frequency bands include 2.4 GHz and 5.9 GHz. Any communication standards can be used to implement the direct inter-vehicle communication. It is possible to use the WAVE (Wireless Access in Vehicular Environment) standard disclosed in IEEE1609, for example.

The onboard system 1 performs the indirect inter-vehicle communication by directly communicating with a base station 4 connected to the wide area communication network 3. The wide area communication network 3 signifies a public telecommunication network such as a mobile telephone network or the Internet provided by a telecommunications carrier.

The onboard system 1 transmits vehicle data packets by using the direct inter-vehicle communication and the indirect inter-vehicle communication. The center 5 receives vehicle data packets via the base station 4 and the wide area communication network 3 when the indirect inter-vehicle communication is used to transmit vehicle data packets.

The center 5 receives a vehicle data packet and transfers it to the onboard system 1 mounted on another vehicle (or a nearby vehicle) existing in a nearby area around the onboard system 1 that transmitted the vehicle data packet. The nearby area covers a range of a predetermined inter-vehicle distance from the onboard system 1 that transmitted the vehicle data packet. The inter-vehicle distance is equal to a straight-line distance between vehicles. The inter-vehicle distance is comparable to an inter-mobile distance.

The location of the vehicle 2 having transmitted the vehicle data packet is needed to determine the nearby area. This location is equal to that contained in the vehicle data packet if the vehicle data packet contains the location of the vehicle 2 mounted with the onboard system 1 having transmitted the vehicle data packet.

The location of each onboard system 1 needs to be identified in order to select the onboard system 1 to which the vehicle data packet is transferred. The center 5 therefore manages current locations of the vehicle 2.

An unshown database may be used to manage current locations of the vehicle 2. The database saves the current location of each vehicle 2 so as to correspond to a vehicle ID. The database representing current locations of the vehicle 2 is hereinafter referred to as a location management database. The onboard system 1 can periodically transmit the current location to the center 5 so that the center 5 can identify the location of the vehicle 2. The onboard systems 1 can exchange the mutual location information by using the direct inter-vehicle communication. In this case, some onboard systems 1 just need to transmit locations of the vehicles 2 to the center. The location management database updates the location management database each time the location of the vehicle 2 is received. The location of the vehicle 2 to select the nearby area may also be equal to that saved in the location management database.

The inter-vehicle distance may be a fixed value or may be dynamically specified in accordance with a traveling speed of the vehicle as a transmission origin. The inter-vehicle distance may be dynamically adjusted to a value corresponding to types of roads traveled by the vehicle as a transmission origin. For example, the inter-vehicle distance may be set to a relatively large value (such as 400 m) when traveling an expressway. The inter-vehicle distance may be set to a value smaller than that specified for the expressway when traveling a general road.

The inter-vehicle distance is favorably set to be longer than a distance capable of the direct inter-vehicle communication and shorter than several times the distance capable of the direct inter-vehicle communication. This can allow the indirect inter-vehicle communication to practically extend an inter-vehicle communication distance and prevent vehicle data packets from being transmitted to an unnecessary communication party. The above-mentioned description of "several times" more specifically signifies twice or three times.

When receiving a vehicle data packet, the center 5 extracts the vehicle 2 existing within the inter-vehicle distance from the vehicle as a transmission origin based on the location management database and transfers the vehicle data packet to the extracted vehicle 2.

Configuration of the Onboard System 1

Figure 2:
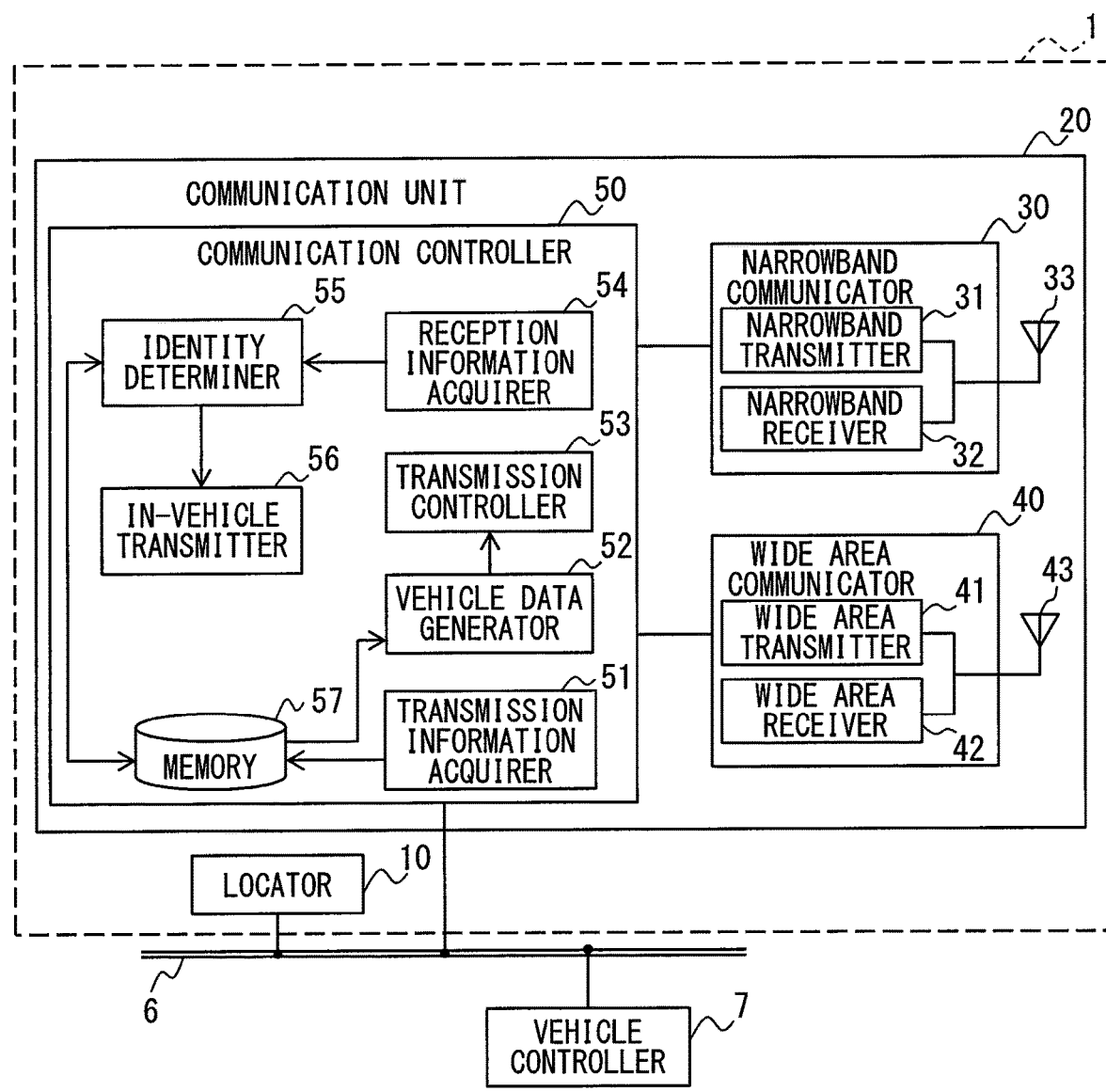
FIG. 2 is a block diagram illustrating a configuration of an onboard system in FIG. 1.

The configuration of the onboard system 1 will be described. As illustrated in FIG. 2, the onboard system 1 includes a locator 10 and a communication unit 20. The communication unit 20 includes a narrowband communicator 30, a wide area communicator 40, and a communication controller 50. The locator 10 and the communication controller 50 are connected so as to be mutually communicable via a communication network 6 (namely LAN or Local Area Network) built in the vehicle.

The LAN 6 also connects with a vehicle controller 7. The communication controller 50 can also communicate with the vehicle controller 7 via the LAN 6. The vehicle controller 7 performs various controls concerning behavior of the vehicle 2 (hereinafter referred to as a subject vehicle) mounted with the vehicle controller 7. The vehicle controller 7 includes one or more controllers. The vehicle controller 7 controls acceleration, deceleration, or steering, for example. The vehicle controller 7 is comparable to a mobile controller.

The vehicle controller 7 acquires detection values of state quantities representing traveling states of the subject vehicle from various sensors mounted on the subject vehicle in order to perform various controls concerning behavior of the subject vehicle. The state quantities representing traveling states of the subject vehicle include a traveling speed, a yaw rate, a steering angle, an acceleration, and a shift position, for example. The location information specified by the locator 10 (to be described) is also included in the state quantity concerning traveling of the subject vehicle.

The locator 10 locates a point where the subject vehicle currently travels. The locator 10 includes a GNSS receiver and map data. The locator 10 successively provides the communication unit 20 with the location information representing the current location. The locator 10 includes the GNSS receiver. Similarly to a known GNSS receiver, the locator 10 therefore successively outputs the UTC time, namely, information representing the current time based on Coordinated Universal Time to the communication unit 20.

The communication unit 20 transmits or receives vehicle data packets from the onboard system 1 mounted on another vehicle existing around the subject vehicle. In the communication unit 20, the narrowband communicator 30 and the wide area communicator 40 are each connected to the communication controller 50 so as to be mutually communicable.

The narrowband communicator 30 provides a communication module to perform direct wireless communication (namely, direct inter-vehicle communication) with other vehicles by using a radio wave in a predetermined frequency band. The narrowband communicator 30 includes a narrowband transmitter 31, a narrowband receiver 32, and an antenna 33. The narrowband transmitter 31 is comparable to a direct transmitter. The narrowband receiver 32 is comparable to a direct receiver. The antenna 33 transmits and receives radio waves in frequency bands used for the direct inter-vehicle communication.

The narrowband receiver 32 demodulates a signal received at the antenna 33 and supplies the signal to the communication controller 50. The narrowband transmitter 31 modulates data supplied from the communication controller 50 and outputs the data to the antenna 33. The antenna 33 irradiates (namely, wirelessly transmits) the data as a radio wave. The CSMA/CA (Carrier Sense Multiple Access/Collision Avoidance) system performs access control over the direct inter-vehicle communication. The narrowband transmitter 31 or the communication controller 50 performs an access control process based on CSMA/CA. The transmission system according to the present embodiment uses the broadcast, but may use the unicast or the multicast.

The wide area communicator 40 provides a communication module that wirelessly connects with the wide area communication network 3 and allows the onboard system 1 to communicate with other communication apparatuses via the wide area communication network 3. The wide area communicator 40 includes a wide area transmitter 41, a wide area receiver 42, and an antenna 43. The wide area transmitter 41 is comparable to an indirect transmitter. The wide area receiver 42 is comparable to an indirect receiver.

The antenna 43 transmits and receives radio waves in predetermined frequency bands used for wireless communication with the base station 4. The wide area receiver 42 demodulates a signal transmitted from the base station 4 and received at the antenna 43 and supplies the signal to the communication controller 50. The wide area transmitter 41 modulates data supplied from the communication controller 50 and outputs the data to the antenna 43. The antenna 43 irradiates (namely, wirelessly transmits) the data as a radio wave.

The communication controller 50 controls operations of the narrowband communicator 30 and the wide area communicator 40. The communication controller 50 will be described in detail later. An overview of the communication controller 50 is as follows. The communication controller 50 generates vehicle data, allows the narrowband communicator 30 to transmit a vehicle data packet containing the vehicle data, and allows the wide area communicator 40 to transmit the vehicle data packet. The narrowband transmission is to transmit a communication packet from the narrowband communicator 30. The wide area transmission is to transmit a communication packet from the wide area communicator 40. The communication controller 50 receives a vehicle data packet transmitted from a nearby vehicle by using the direct inter-vehicle communication and the indirect inter-vehicle communication.

Configuration of the Communication Controller 50

The configuration of the communication controller 50 will be described. The communication controller 50 is comparable to the mobile body transmission control device and the mobile body receiving control device. The communication controller 50 is configured as a computer including a CPU, RAM, ROM, I/O, and a bus line to connect these components. The ROM stores vehicle IDs and a program (hereinafter referred to as a communication control program) that allows a general-purpose computer to function as the communication controller 50.

The above-mentioned communication control program may be stored in a non-transitory tangible storage medium, not limited to the ROM as a specific recording medium. The communication control program may be saved in the flash memory, for example. Allowing the CPU to perform the communication control program is comparable to performing a method corresponding to the communication control program.

The communication controller 50 provides various functions illustrated in FIG. 2 by allowing the CPU to execute the above-mentioned communication control program stored in the ROM. The communication controller 50 includes function blocks such as a transmission information acquirer 51, a vehicle data generator 52, a transmission controller 53, a reception information acquirer 54, an identity determiner 55, and an in-vehicle transmitter 56.

All or part of the function blocks included in the communication controller 50 may be implemented as one or more IC chips (namely hardware). All or part of the function blocks included in the communication controller 50 may be implemented as a combination of the software executed by the CPU and hardware members.

When the communication controller 50 is energized, the transmission information acquirer 51 acquires the location information representing the current location from the locator 10 via the LAN 6. The transmission information acquirer 51 acquires various types of information representing traveling states of the subject vehicle from the vehicle controller 7. Turning on an ignition switch energizes the communication controller 50, for example.

These pieces of information acquired by the transmission information acquirer 51 are transmitted as vehicle data. The information is acquired at the same cycle as that to generate and transmit the vehicle data. The transmission information acquirer 51 saves these pieces of acquired information in a transmission information storage area of memory 57 for a predetermined period of time. The memory 57 is a rewritable storage medium and is provided as the RAM included in the communication controller 50, for example.

The vehicle data generator 52 generates vehicle data at predetermined generation cycle Tg based on various types of information saved in the transmission information storage area of the memory 57. The vehicle data represents a traveling state of the subject vehicle at the time of the generation. The information saved in the transmission information storage area is used to generate the vehicle data representing a traveling state of the subject vehicle at the time of the generation. The information is therefore deleted from the memory 57 when the information exceeds a predetermined time (such as generation cycle Tg) elapsed from the time the information was saved.

Generation cycle Tg is set to 100 milliseconds, for example. The vehicle data generated by the vehicle data generator 52 is comparable to a data body (so-called payload) contained in a vehicle data packet. The vehicle data is comparable to first mobile information or mobile information. The vehicle data generated by the vehicle data generator 52 is saved in the memory 57 and is supplied to the transmission controller 53.

The transmission controller 53 generates a vehicle data packet each time the vehicle data generator 52 supplies vehicle data. The vehicle data packet contains the vehicle data. The vehicle data packet is made of the vehicle data supplemented by a vehicle ID and the time information when the vehicle data packet was generated. The vehicle ID and the time information are used as identification codes to distinguish the vehicle data packet from the other vehicle data packets. The time information is incorporated from a clock portion provided inside the communication controller 50. The time information in the clock portion is adjusted to the UTC time output from the locator 10 and practically signifies the UTC time.

The time information attached to the vehicle data is used to identify that the same data results from the vehicle data packet transmitted from the narrowband communicator 30 and the vehicle data packet transmitted from the wide area communicator 40. The time information attached to the vehicle data therefore need not strictly represent the vehicle data packet generation time. Supposing that the vehicle data contains the location information as vehicle data acquired from the locator 10, the time information attached to the vehicle data may be incorporated from the UTC time that can be inevitably acquired from the locator 10 when the location information representing the current location is acquired from the locator 10.

According to the present embodiment, the packet signifies data as a whole, not a data unit that is divided into a predetermined data quantity during the transmission. Namely, the vehicle data packet signifies data as a whole including the vehicle data supplemented by the vehicle ID and the time information when the vehicle data packet was generated. The use of the vehicle data packet in this significance does not hinder the transmission of a vehicle data packet divided into a plurality of data during the transmission.

During a simultaneous transmission cycle, the transmission controller 53 outputs the generated vehicle data packet to the narrowband transmitter 31 and the wide area transmitter 41. Outside the simultaneous transmission cycle, the transmission controller 53 outputs the generated vehicle data packet only to the narrowband transmitter 31.

The simultaneous transmission cycle conforms to an integral multiple of a cycle for the vehicle data generator 52 to generate vehicle data. The integral multiple is set to 10 according to the present embodiment. The transmission controller 53 outputs the vehicle data packet to the narrowband transmitter 31 and the wide area transmitter 41 each time vehicle data generator 52 generates vehicle data ten times. The integral multiple may be set to 1 instead of 10. Namely, the transmission controller 53 may output the generated vehicle data packet to the narrowband transmitter 31 and the wide area transmitter 41 every time.

The narrowband transmitter 31 modulates the supplied vehicle data packet and broadcasts it from the antenna 33. The narrowband transmitter 31 is supplied with a vehicle data packet each time the vehicle data packet is generated. The cycle to transmit the vehicle data packet from the antenna 33 is therefore equal to generation cycle Tg for the vehicle data.

The wide area transmitter 41 demodulates the supplied vehicle data packet and transmits it from the antenna 43. The base station 4 receives the vehicle data packet transmitted from the antenna 43 and transmits the vehicle data packet to the center 5 via the wide area communication network 3.

It is supposed that a vehicle data packet is transmitted from the narrowband communicator 30 of the onboard system 1 mounted on another vehicle 2 and the subject vehicle is capable of narrowband communication with the other vehicle 2. In this case, the narrowband receiver 32 uses the antenna 33 to receive the vehicle data packet transmitted from the other vehicle 2.

Supposing that the subject vehicle exists in a nearby area settled by the center 5 with reference to the location of the other vehicle 2, the center 5 transmits the vehicle data packet transmitted from the other vehicle 2. The wide area receiver 42 uses the antenna 43 to receive the vehicle data packet transmitted from the center 5.

The reception information acquirer 54 receives a vehicle data packet from the narrowband receiver 32 when the narrowband receiver 32 receives the vehicle data packet. The reception information acquirer 54 receives a vehicle data packet from the wide area receiver 42 when the wide area receiver 42 receives the vehicle data packet.

It is supposed that the reception information acquirer 54 acquires a vehicle data packet from one of the wide area receiver 42 and the narrowband receiver 32. In this case, the identity determiner 55 determines whether the acquired vehicle data packet is identical to the vehicle data packet stored in the memory 57. According to the present embodiment, being identical signifies that the vehicle ID and the time information contained in the vehicle data packet, namely, attached to the vehicle data, both conform to the corresponding ones.

The vehicle ID and the time information contained in the vehicle data packet both conform to the corresponding ones only when the narrowband transmitter 31 and the wide area transmitter 41 transmit the same vehicle data packets from the other vehicle 2 and the narrowband receiver 32 and the wide area receiver 42 of the subject vehicle both receive the same vehicle data packets. The identity determiner 55 therefore determines whether the vehicle data packet acquired by the reception information acquirer 54 from the wide area receiver 42 is identical to the vehicle data packet acquired by the reception information acquirer 54 from the narrowband receiver 32.

As a result of the above-mentioned determination, the identity determiner 55 may determine that the acquired vehicle data packet is not identical to the vehicle data packet stored in the memory 57. In this case, the identity determiner 55 transmits the vehicle data packet to the in-vehicle transmitter 56 and saves the vehicle data packet in a reception information storage area of the memory 57. The identity determiner 55 may determine that the acquired vehicle data packet is identical to the vehicle data packet stored in the memory 57. In this case, the identity determiner 55 discards the acquired vehicle data packet.

When a vehicle data packet is supplied from the identity determiner 55, the in-vehicle transmitter 56 outputs vehicle data contained in the vehicle data packet to the vehicle controller 7. The in-vehicle transmitter 56 is comparable to a mobile transmitter. In addition to the vehicle data, either or both the vehicle ID and the time information may be output to the vehicle controller 7.

Vehicle Data Packet Transmission Process

The description below explains a vehicle data packet transmission process performed by the communication controller 50 with reference to the flowchart illustrated in FIG. 3. It is assumed that the communication controller 50 included in the onboard system 1a mounted on a vehicle 2a performs the process in FIG. 3. In this case, the vehicle 2a is comparable to a first mobile body. The onboard system 1a functions as a mobile body transmission device.

Figure 3:
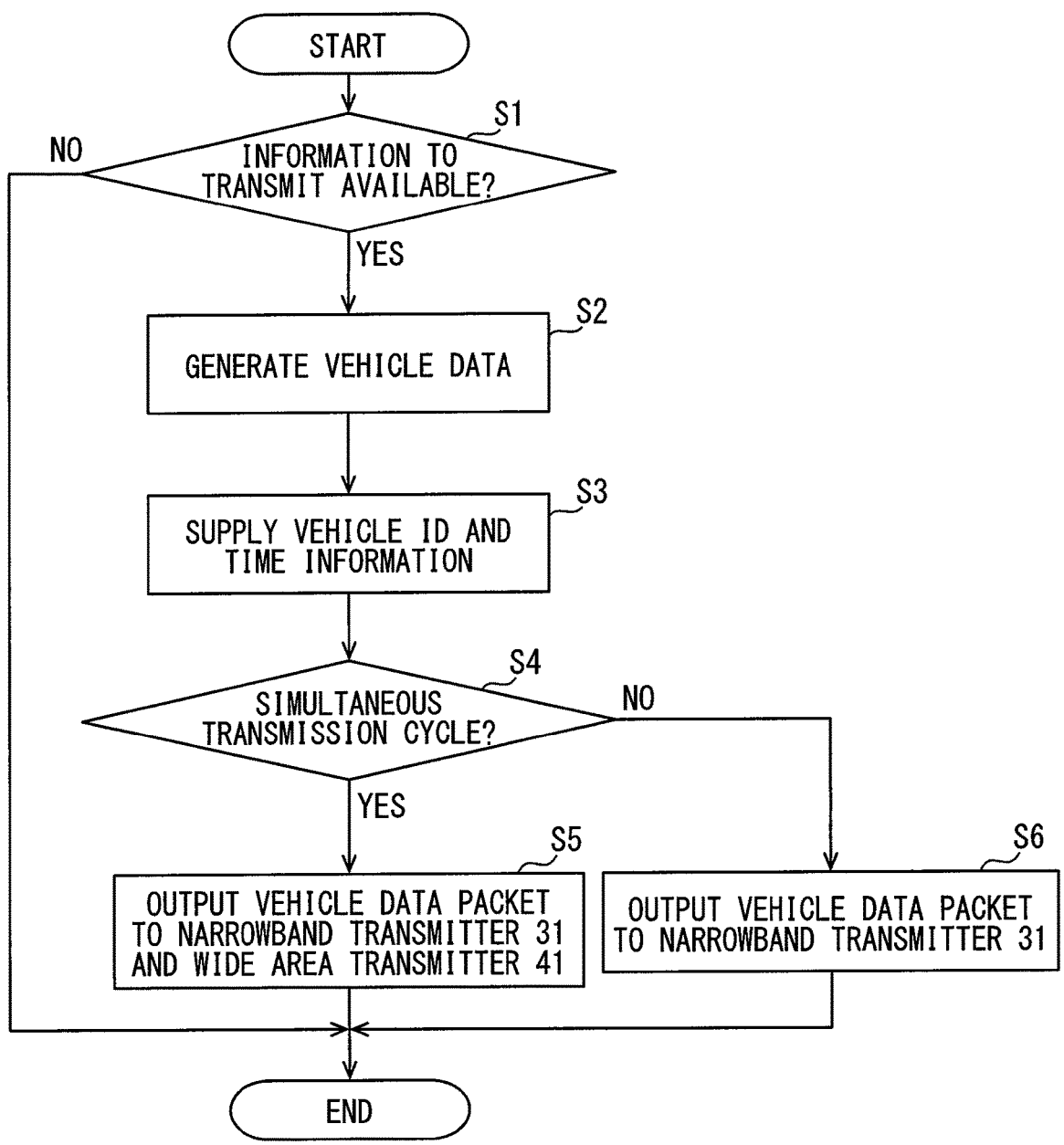
FIG. 3 is a flowchart illustrating a vehicle data packet transmission process performed by a communication controller in FIG. 2.

The vehicle data generator 52 and the transmission controller 53 perform the process in FIG. 3. Independently of this process, the transmission information acquirer 51 performs a process that acquires information from the locator 10 or the vehicle controller 7 and stores the information in the memory 57.

At step S1 ("step" is omitted hereinafter), the vehicle data generator 52 references the memory 57 to determine whether there is information to be transmitted. As above, the vehicle data generator 52 generates vehicle data at generation cycle Tg. Therefore, S1 is performed at every generation cycle Tg. The determination at S1 results in YES if the memory 57 saves information not used for generation of vehicle data. The determination at S1 results in NO if the memory 57 does not save information not used for generation of vehicle data.

The vehicle data packet transmission process terminates if the determination at S1 results in NO. The process proceeds to S2 if determination at S1 results in YES. At S2, the vehicle data generator 52 generates vehicle data based on the information saved in the memory 57.

The transmission controller 53 performs S3 through S6 below. At S3, the process supplies the vehicle data generated at S2 with a vehicle ID and time information to generate a vehicle data packet. At S4, the process determines whether the simultaneous transmission cycle is active. The process proceeds to S5 if the determination at S4 results in YES. At S5, the process outputs the vehicle data packet to the narrowband transmitter 31 and the wide area transmitter 41. Performing the process at S5 simultaneously outputs the identical vehicle data packet to the narrowband transmitter 31 and the wide area transmitter 41. The process proceeds to S6 if the determination at S4 results in NO. At S6, the process outputs the vehicle data packet only to the narrowband transmitter 31.

The narrowband transmitter 31 and the wide area transmitter 41 supplied with the vehicle data packet transmit the vehicle data packet when the narrowband transmitter 31 and the wide area transmitter 41 are ready for transmission by performing a process to settle CSMA/CA or resource allocation. As above, the vehicle data contained in the vehicle data packet is comparable to the first mobile information or the mobile information.

Vehicle Data Packet Reception Process

The description below explains a vehicle data packet reception process performed by the communication controller 50 with reference to the flowchart illustrated in FIG. 4. It is assumed that the communication controller 50 included in the onboard system 1b mounted on a vehicle 2b performs the process in FIG. 4. In this case, the vehicle 2b is comparable to a second mobile body. The onboard system 1b functions as a mobile body reception device.

Figure 4:
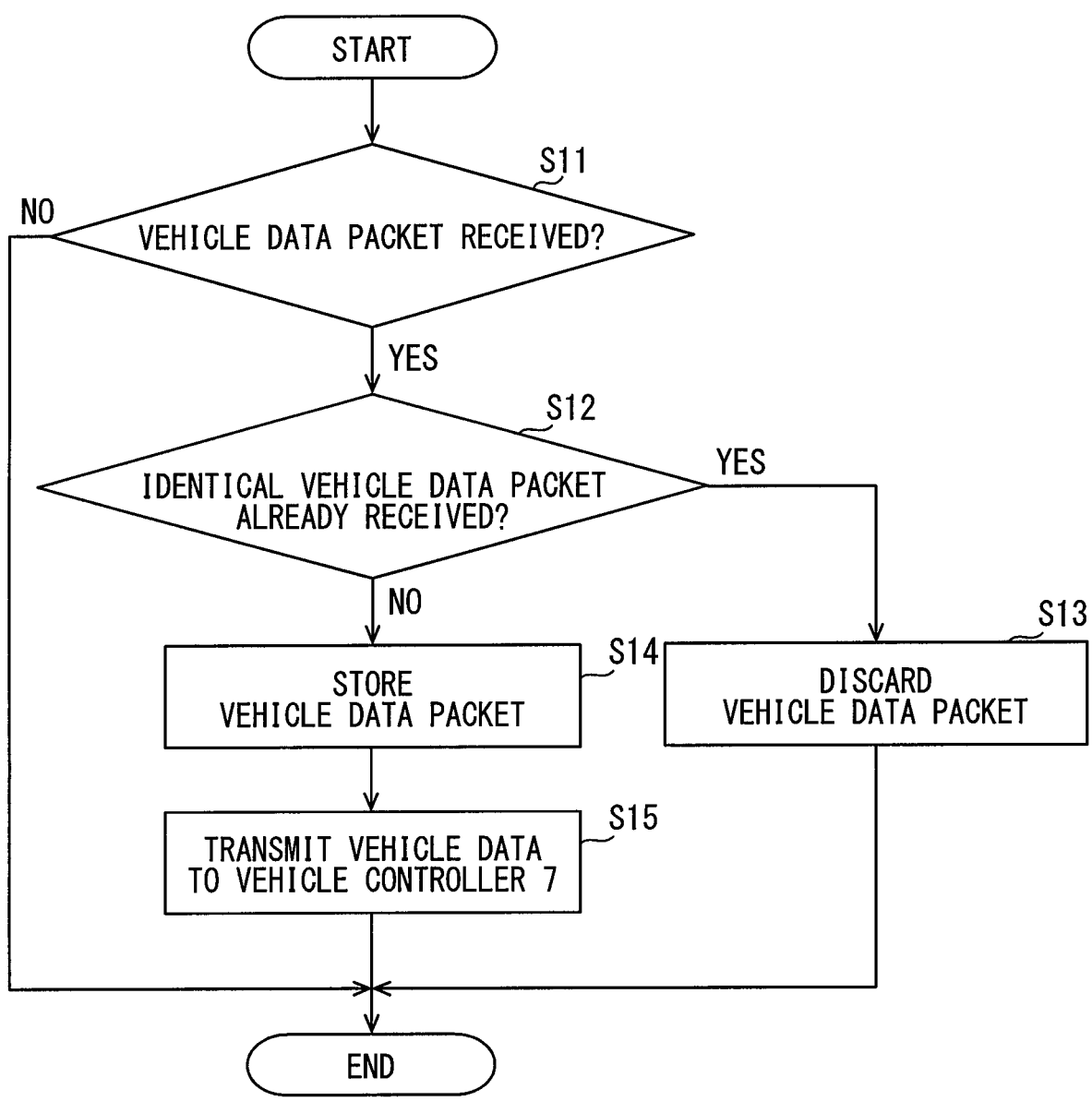
FIG. 4 is a flowchart illustrating a vehicle data packet reception process performed by the communication controller in FIG. 2.

The process in FIG. 4 is performed at a predetermined cycle when the communication controller 50 is energized. The predetermined cycle is equal to generation cycle Tg described above, for example. At S11, the reception information acquirer 54 determines whether the narrowband receiver 32 or the wide area receiver 42 receives a vehicle data packet. This determination is performed by determining whether a vehicle data packet is received from the narrowband receiver 32 or the wide area receiver 42. The vehicle data contained in the received vehicle data packet is comparable to other-mobile information.

The narrowband receiver 32 of the vehicle 2b receives the vehicle data packet if the communication controller 50 of the vehicle 2a performs S5 or S6 in FIG. 3, the narrowband transmitter 31 of the vehicle 2a transmits the vehicle data packet, and the vehicle 2b exists at the location to enable direct inter-vehicle communication with the vehicle 2a. In this case, the determination at S11 results in YES. The narrowband receiver 32 of the vehicle 2b receives the vehicle data packet if the communication controller 50 of the vehicle 2a performs S5 in FIG. 3, the wide area transmitter 41 of the vehicle 2a transmits the vehicle data packet, and the vehicle 2b exists in a nearby area with reference to the vehicle 2a. Also in this case, the determination at S11 results in YES. The process proceeds to S12 if the determination at S11 is YES. The process in FIG. 4 terminates if the determination at S11 is NO.

The identity determiner 55 performs S12 through S14. At S12, the process determines whether the already received vehicle data packet is identical to the vehicle data packet that is determined to be received at S11. The narrowband receiver 32 and the wide area receiver 42 receive the same vehicle data packet if the communication controller 50 of the vehicle 2a performs S5 in FIG. 3 and the vehicle 2b is capable of both the direct inter-vehicle communication and the indirect inter-vehicle communication with the vehicle 2a. The vehicle data packet is received by the narrowband receiver 32 or the wide area receiver 42 whichever receives the vehicle data packet later. The determination at S12 based on the vehicle data packet results in YES. The process proceeds to S13 if the determination at S12 is YES. At S13, the process discards the most recently acquired vehicle data packet.

The process proceeds to S14 if the determination at S12 is NO. At S14, the process stores the most recently acquired vehicle data packet in the memory 57. At S15, the in-vehicle transmitter 56 transmits the vehicle data contained in the most recently acquired vehicle data packet or at least one of the vehicle ID and the time information in addition to the vehicle data to the vehicle controller 7.

Review of the First Embodiment

The description below explains a review of the first embodiment with reference to the examples in FIGS. 3 and 4. According to the above-mentioned configuration, the transmission controller 53 included in the onboard system 1a used for the vehicle 2a performs S5 and allows the narrowband transmitter 31 and the wide area transmitter 41 to transmit the identical vehicle data packet. The onboard system 1b used for the vehicle 2b includes the wide area receiver 42 and the narrowband receiver 32. A vehicle data packet can be therefore received when the wide area transmitter 41 of the onboard system 1a transmits the vehicle data packet or when the narrowband transmitter 31 of the onboard system 1a transmits the vehicle data packet. This can therefore provide the highly robust inter-vehicle communication.

Performing S5 in FIG. 3 performs the process that simultaneously transmits the identical vehicle data packet. This can therefore provide the highly robust and highly real-time inter-vehicle communication.

The first embodiment uses the time information contained in the vehicle data packet to determine whether the received vehicle data packet is identical to the already received vehicle data packet. The determination about the identity can be performed more highly accurately than the determination about the identity using a sequence number supplied in place of the time information. It is also determined whether the vehicle ID is identical. It is therefore possible to more highly accurately determine whether the most recently received vehicle data packet is identical to the already received vehicle data packet.

Supposing that the time information as well as the vehicle data is transmitted to the vehicle controller 7, the vehicle controller 7 having received the vehicle data can determine at which time point the vehicle data is validated. It is easy to determine whether to use the vehicle data transmitted from the communication controller 50 when the vehicle controller 7 performs real-time-critical vehicle control. According to the first embodiment, the time information provides the current time in terms of the UTC time. The vehicle controller 7 can therefore determine update of the vehicle data acquired from the communication controller 50 based on the time synchronized between vehicles.

Second Embodiment

The second embodiment will be described. The description below about the second embodiment may include an element assigned the same reference numeral as that used hitherto. Except as otherwise noted, such element is equal to the element that is assigned the same reference numeral and is described in the previous embodiment. A configuration may be described only partially. In such a case, the previous embodiment is applicable to the remaining part of the configuration.

Figure 5:
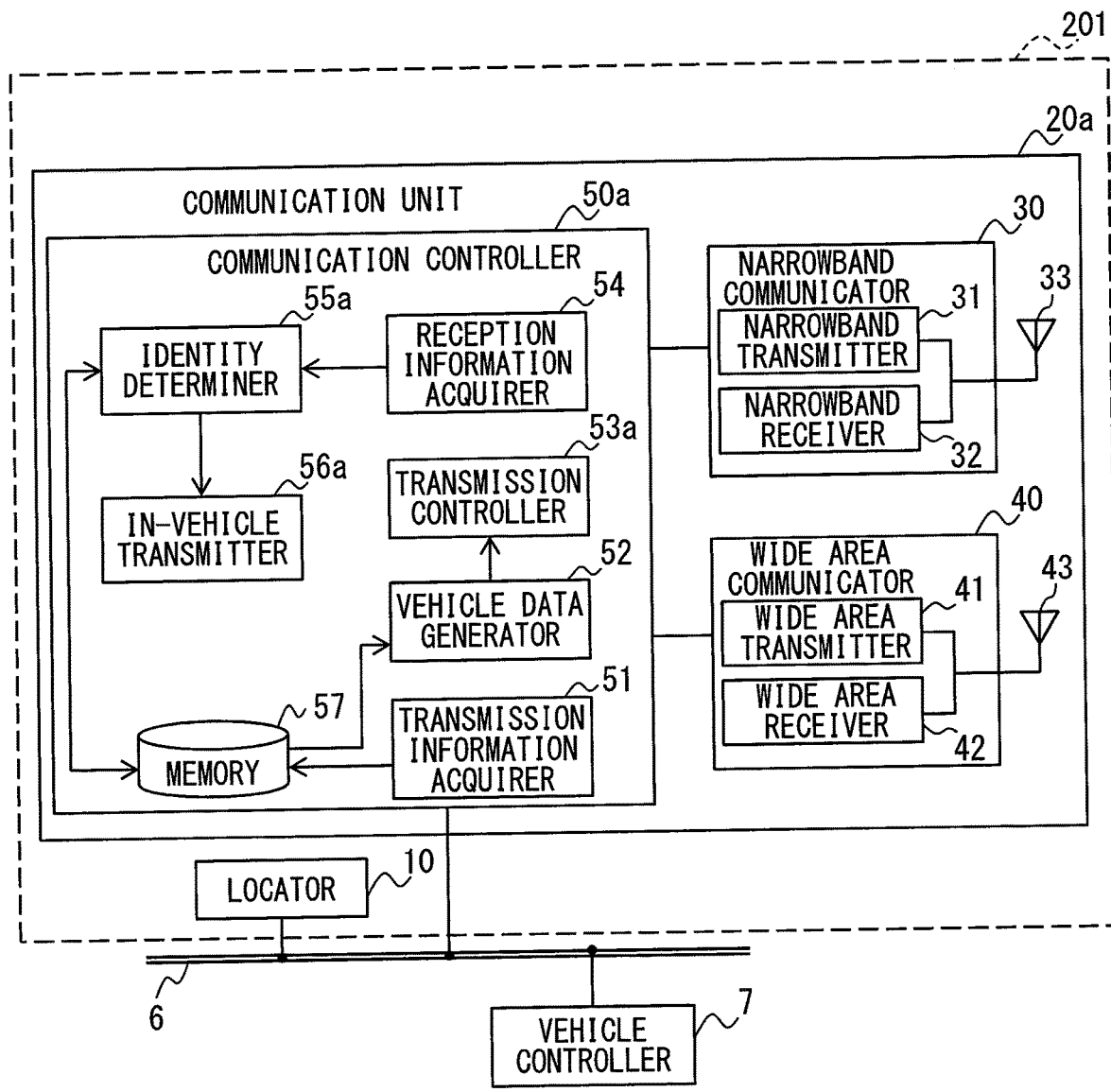
FIG. 5 is a block diagram illustrating a configuration of the onboard system according to a second embodiment.

FIG. 5 illustrates a configuration of an onboard system 201 according to the second embodiment. As illustrated in FIG. 2, the onboard system 201 according to the second embodiment includes the locator 10 and a communication unit 20a. The communication unit 20a includes a communication controller 50a that is configured differently from the communication controller 50 according to the first embodiment.

More specifically, the communication controller 50a allows a transmission controller 53a, an identity determiner 55a, and an in-vehicle transmitter 56a to perform processes different from those performed by the transmission controller 53, the identity determiner 55, and the in-vehicle transmitter 56 according to the first embodiment.

The transmission controller 53a supplies a vehicle data packet to be transmitted during the simultaneous transmission cycle with a simultaneous transmission flag signifying that the narrowband transmitter 31 and the wide area transmitter 41 transmit the same vehicle data packet. Otherwise, the transmission controller 53a performs the same process as that performed by the transmission controller 53 according to the first embodiment. Processes performed by the identity determiner 55a and the in-vehicle transmitter 56a will be described with reference to FIG. 6. The in-vehicle transmitter 56a is comparable to the mobile transmitter.

Figure 6:
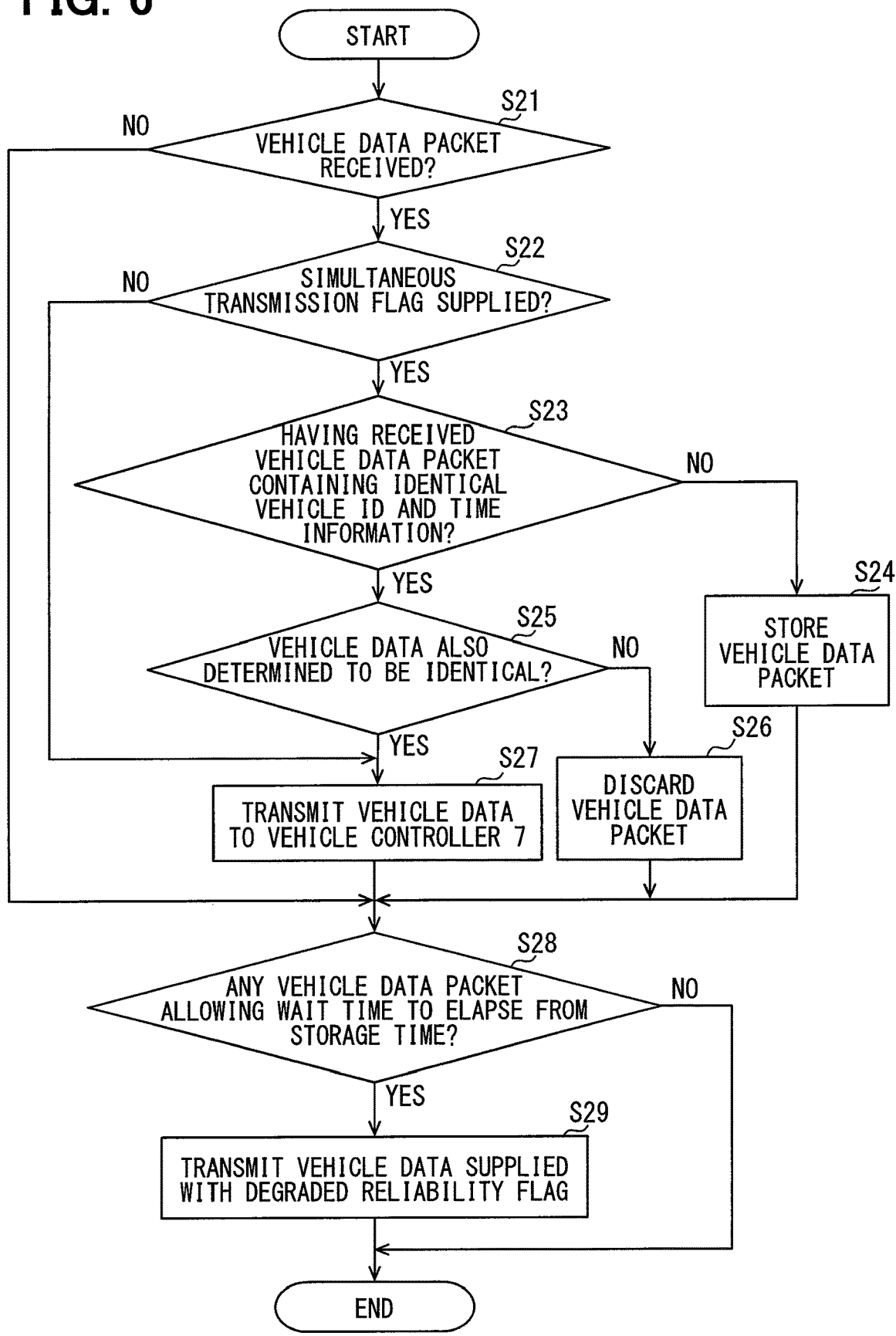
FIG. 6 is a flowchart illustrating a vehicle data packet reception process performed by the communication controller in FIG. 5.

FIG. 6 illustrates the vehicle data packet reception process performed by the communication controller 50a according to the second embodiment. The process in FIG. 6 replaces the process in FIG. 4 and uses the same execution cycle as that in FIG. 4.

At S21, the reception information acquirer 54 determines whether the narrowband receiver 32 or the wide area receiver 42 receives a vehicle data packet. The process at S21 is equal to that at S11 in FIG. 4. The process proceeds to S22 if the determination at S21 results in YES. The process proceeds to S28 if the determination at S21 results in NO. In the subsequent process, the identity determiner 55a performs S22 through S26 and the in-vehicle transmitter 56a performs S27 through S29.

At S22, the process determines whether a simultaneous transmission flag is supplied to the vehicle data packet that is determined to be received at S21. The process proceeds to S23 if the determination results in YES. The process proceeds to S27 if the determination results in NO. At S27, the process transmits vehicle data. The process transmits vehicle data by omitting the determinations at S23 and S25 if the vehicle data packet is not supplied with the simultaneous transmission flag.

At S23, the process determines whether the already received vehicle data packet contains the vehicle ID and the time information identical to the vehicle ID and the time information contained in the vehicle data packet determined to be received at S21. Similarly to S12 in FIG. 4, the process determines whether to have received the vehicle data packet containing the identical vehicle ID and time information. The process performs the determination by comparing the most recently received vehicle data packet with the vehicle data packet stored in the memory 57. However, the second embodiment does not determine that the vehicle data packet is identical only because the vehicle ID and the time information are identical. At S25, the process further determines whether the vehicle data is also identical.

The process proceeds to S24 if the determination at S23 results in NO. At S24, the process stores the most recently received vehicle data packet in a reception data storage area of the memory 57. The process then proceeds to S28.

According to the first embodiment, the vehicle data contained in the vehicle data packet is transmitted to the vehicle controller 7 if the vehicle ID and the time information in the most recently received vehicle data packet differ from the vehicle ID and the time information in the vehicle data packet stored in the memory 57. According to the second embodiment, however, the process proceeds to S25 if the determination at S23 is YES.

At S25, the process determines whether the vehicle data contained in the most recently received vehicle data packet is equal to the vehicle data contained in the vehicle data packet stored in the reception data storage area of the memory 57. The process proceeds to S25 if the determination at S25 is NO.

The determination at S25, if resulting in NO, signifies that the received vehicle data packet contains different vehicle data although the vehicle ID and the time information are identical. In this case, it is highly likely that falsified vehicle data is contained in at least one of the most recently received vehicle data packet and the vehicle data packet stored in the memory 57. At S26, the process discards two vehicle data packets containing different vehicle data although the vehicle ID and the time information are identical. These two vehicle data packets are therefore not transmitted to the vehicle controller 7. This can prevent the vehicle control from being performed based on falsified vehicle data.

At S26, the data may be discarded after a predetermined time. The predetermined time signifies that the vehicle controller 7 is likely to use vehicle data during that time. A further vehicle data packet may be received and is likely to be falsified. In such a case, it is possible to prevent vehicle data contained in the vehicle data packet from being transmitted to the vehicle controller 7 within the time during which the vehicle controller 7 is likely to use the vehicle data.

Only the most recently received vehicle data packet may be discarded at S26. Alternatively, the most recently received vehicle data packet may be overwritten to the vehicle data packet stored in the memory 57. This can also prevent vehicle data contained in a further received vehicle data packet from being transmitted to the vehicle controller 7 when the vehicle data packet is likely to be falsified.

The second embodiment determines that the vehicle data packet is identical if the determination at S25 also results in YES. The process proceeds to S27 if the determination at S25 is YES. At S27, the process transmits the vehicle data contained in the most recently received vehicle data packet to the vehicle controller 7. Obviously, the vehicle data contained in the vehicle data packet stored in the memory 57 may be transmitted to the vehicle controller 7 because the vehicle data packet is determined to be identical. Similarly to the first embodiment, at least one of the vehicle ID and the time information in addition to the vehicle data may be transmitted to the vehicle controller 7.

The process proceeds to S28 if the determination at S21 is NO or any one of S24, S26, and S27 is performed. At S28, the process determines whether there is a vehicle data packet that allows a wait time to elapse from the storage time. The wait time is predetermined so as to correspond to a maximum delay time expected to be necessary for the direct inter-vehicle communication and the indirect inter-vehicle communication. This determination is excluded from a vehicle data packet that is already processed at S27 or is processed at S29 and then is transmitted to the vehicle controller 7.

The process in FIG. 6 terminates without performing S29 if the determination at S28 results in NO. The process proceeds to S29 if the determination at S28 results in YES. At S29, the process transmits the vehicle data supplied with a degraded reliability flag to the vehicle controller 7. This vehicle data is contained in the vehicle data packet determined as YES at S28. Similarly to S27, the process may transmit at least one of the vehicle ID and the time information in addition to the vehicle data.

The degraded reliability flag is supplied because no determination result is acquired from S23 and S25 performed by the identity determiner 55a although the same vehicle data packet is transmitted from the narrowband transmitter 31 and the wide area transmitter 41. The degraded reliability flag therefore signifies that the identity determiner 55a performs no determination. The degraded reliability flag also signifies that there is no evidence to support unavailability of falsification because the identity determiner 55a performs no determination.

Review of the Second Embodiment

In the onboard system 201 according to the second embodiment, the identity determiner 55a determines whether a vehicle data packet received by one of the narrowband receiver 32 and the wide area receiver 42 is identical to the already received vehicle data packet. The most recently received vehicle data packet is identical to the already received vehicle data packet when the identical vehicle data packet is already received by the narrowband receiver 32 or the wide area receiver 42 whichever is contrary to the receiver having received the most recently received vehicle data packet. The identity determiner 55a therefore determines whether the vehicle data packet acquired by the reception information acquirer 54 from the wide area receiver 42 is identical to the vehicle data packet acquired from the narrowband receiver 32.

The identity determiner 55a determines whether the vehicle ID and the time information are identical and whether the vehicle data is also identical while determining the most recently received vehicle data packet is identical to the already received vehicle data packet. It is therefore possible to determine whether the vehicle data is likely to be falsified.

In addition, the process at S28 and S29 is performed to transmit the vehicle data to the vehicle controller 7 even when only one of the narrowband receiver 32 and the wide area receiver 42 can receive a vehicle data packet. This can therefore also provide the highly robust inter-vehicle communication.

The vehicle data supplied with the degraded reliability flag is transmitted to the vehicle controller 7 when only one of the narrowband receiver 32 and the wide area receiver 42 can receive a vehicle data packet. The vehicle controller 7 can provide control in consideration of the reliability of the vehicle data transmitted from the communication controller 50a.

It is supposed that the communication controller 50a transmits vehicle data supplied with the degraded reliability flag, for example. In this case, the vehicle controller 7 confirms continuity with one or more vehicle data transmitted from the communication controller 50a immediately before the vehicle data supplied with the degraded reliability flag. It is possible to perform a process such as controlling the vehicle by using the vehicle data supplied with the degraded reliability flag only when the data continuity is confirmed.

While there have been described the embodiments of the present disclosure, the disclosure is not limited to the above-mentioned embodiments. Embodiments described below are also included in the technical scope of the disclosure. Furthermore, the disclosure may be embodied in various modifications without departing from the spirit and scope of the disclosure.

First Modification

According to the first and the second embodiments, the communication unit 20 or 20a includes the narrowband communicator 30 and the wide area communicator 40. However, either or both the narrowband communicator 30 and the wide area communicator 40 may be provided outside the communication unit 20 or 20a. The LAN 6 may connect the communication unit 20 or 20a with the narrowband communicator 30 and the wide area communicator 40.

Second Modification

According to the first and the second embodiments, the narrowband transmitter 31 and the wide area transmitter 41 simultaneously transmit the identical vehicle data packet. However, the narrowband transmitter 31 and the wide area transmitter 41 may transmit the identical vehicle data packet at different transmission time points.

Third Modification

The above-mentioned embodiments use the vehicle ID and the time information as identification codes. However, a sequence number may be used as the identification code.

Fourth Modification

The above-mentioned embodiments provide the vehicle as an example of a mobile body. However, the mobile body is not limited to the vehicle. The mobile body may represent a pedestrian, for example.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A system for communication between mobile bodies comprising:
    a mobile body transmission device, having a first processor and a first memory, that is used for a first mobile body and successively transmits first mobile information as information about the first mobile body; and
    a mobile body reception device, having a second processor and a second memory, that is used for a second mobile body and receives the first mobile information, wherein:
    the mobile body transmission device includes:
        an indirect transmitter that transmits information via a base station;
        a direct transmitter that transmits information according to direct transmission; and
        a transmission controller that controls the indirect transmitter and the direct transmitter to transmit an identical first mobile information; and
    the mobile body reception device includes:
        an indirect receiver that receives the first mobile information transmitted by the indirect transmitter via the base station; and
        a direct receiver that directly receives the first mobile information transmitted by the direct transmitter;

wherein:
the transmission controller puts an identical identification code to the identical first mobile information to be transmitted from the indirect transmitter and the direct transmitter, and transmits the first mobile information; and the second processor and the second memory of the mobile body reception device are configured to:
acquire the first mobile information from the indirect receiver when the indirect receiver receives the first mobile information and acquire the first mobile information from the direct receiver when the direct receiver receives the first mobile information;
compare two pieces of the first mobile information, determine whether the first mobile information acquired from the indirect receiver is identical to the first mobile information acquired from the direct receiver, and determine whether two identification codes put to the two pieces of the first mobile information are identical;
transmit the first mobile information to a mobile controller used for the second mobile body in response to the two pieces of the first mobile information being identical and the two identification codes being identical;
not transmit the first mobile information, which is determined not to be identical, to the mobile controller used for the second mobile body in response to determining that the two identification codes are identical but the two pieces of the first mobile information are not identical; and
transmit, in response to acquiring the first mobile information from one of the indirect receiver and the direct receiver and subsequently not acquiring the first mobile information within a predetermined wait time from the other of the indirect receiver and the direct receiver from which the first mobile information has not been acquired, an acquired first mobile information to the mobile controller without a determination result of whether the first mobile information acquired from the indirect receive is identical the first mobile information acquired from the direct receiver and whether two identification codes put to the two pieces of the first mobile information identical.

2. The system for communication between mobile bodies according to claim 1, wherein:
the transmission controller simultaneously transmits the identical first mobile information to the indirect transmitter and the direct transmitter.

3. The system for communication between mobile bodies according to claim 1, wherein:
the second processor and the second memory of the mobile body reception device are further configured to:
determine whether a most recently acquired first mobile information is identical to an already acquired first mobile information when the first mobile information is acquired from one of the indirect receiver and the direct receiver; and
transmit the most recently acquired first mobile information to a mobile controller used for the second mobile body in response to determining that the most recently acquired first mobile information is not identical to the already acquired first mobile information.

4. The system for communication between mobile bodies according to claim 3, wherein:
the transmission controller puts an identical identification code to the identical first mobile information to be transmitted from the indirect transmitter and the direct transmitter, and transmits the first mobile information; and
the second processor and second memory of the mobile body reception device are configured to determine based on the identification code whether two pieces of the first mobile information are identical.

5. The system for communication between mobile bodies according to claim 1, wherein:
when the second processor and second memory of the mobile body reception device transmit the first mobile information to the mobile controller without the determination result, the second processor and second memory are further configured to put a flag, indicating that the determination result has not been determined, to the first mobile information, and to transmit the first mobile information to the mobile controller.

6. The system for communication between mobile bodies according to claim 4, wherein:
the identification code is provided as time information of generating time for information to be transmitted.

7. The system for communication between mobile bodies according to claim 6, wherein:
the time information represents a current time based on Coordinated Universal Time.

8. The system for communication between mobile bodies according to claim 1, comprising:
a center having a third processor and a third memory configured to receive the first mobile information transmitted by the indirect transmitter of the mobile body transmission device via the base station, and transfer a received first mobile information to the mobile body reception device used for the second mobile body disposed within a predetermined inter-mobile distance to the first mobile body using the mobile body transmission device.

9. A mobile body receiving control device that is used for a mobile body having: an indirect receiver receiving other-mobile information via a base station, the other-mobile information being transmitted from an other mobile body relating to the other mobile body, the other mobile body having an indirect transmitter that transmits information via a base station, a direct transmitter that transmits information according to direct transmission, and a transmission controller that controls the indirect transmitter and the direct transmitter to transmit identical other-mobile information; and a direct receiver directly receiving the other-mobile information, the mobile body receiving control device comprising a processor and a memory configured to:
acquire the other-mobile information from the indirect receiver when the indirect receiver receives the other-mobile information, and acquire the other-mobile information from the direct receiver when the direct receiver receives the other-mobile information;
determine whether a most recently acquired other-mobile information is identical to an already acquired other-mobile information when the other-mobile information is acquired from one of the indirect receiver and the direct receiver;
transmit the most recently acquired other-mobile information to a mobile controller used for the mobile body when the processor and the memory determine that the most recently acquired other-mobile information is not identical to the already acquired other-mobile information;

wherein:

the transmission controller puts an identical identification code to the identical other-mobile information to be transmitted from the indirect transmitter and the direct transmitter, and transmits the other-mobile information;

the processor and the memory of the mobile body receiving control device are further configured to:

acquire the other-mobile information from the indirect receiver when the indirect receiver receives the other-mobile information, and acquire the other-mobile information from the direct receiver when the direct receiver receives the other-mobile information;

compares two pieces of the other-mobile information, determines whether the other-mobile information acquired from the indirect receiver is identical to the other-mobile information acquired from the direct receiver, and determine whether two identification codes put to the two pieces of the other-mobile information are identical;

transmit the other mobile information to a mobile controller used for the other mobile body when the processor and the memory determine that the two pieces of the other-mobile information are identical and the two identification codes are identical;

and not transmit the other-mobile information, which is determined not to be identical, to the mobile controller used for the other mobile body when the processor and the memory determine that the two identification codes are identical but the two pieces of the other-mobile information are not identical; and transmit, in response to acquiring the other-mobile information from one of the indirect receiver and the direct receiver and subsequently not acquiring the other mobile information within a predetermined wait time from the other of the indirect receiver and the direct receiver from which the processor and the memory has not acquired the other-mobile information, an acquired first mobile information to the mobile controller without a determination result of whether the other-mobile information acquired from the indirect receiver is identical to the other-mobile information acquired from the direct receiver and whether two identification codes put to the two pieces of the other-mobile information are identical.

* * * * *